United States Patent
Abdel Shahid et al.

(10) Patent No.: US 11,729,676 B2
(45) Date of Patent: *Aug. 15, 2023

(54) HANDOVER BETWEEN NON-STANDALONE AND STANDALONE NETWORKS

(71) Applicant: T-Mobile USA, Inc., Bellevue, WA (US)

(72) Inventors: Wafik Abdel Shahid, Kenmore, WA (US); Ming Shan Kwok, Seattle, WA (US); Yasmin Karimli, Kirkland, WA (US); Thomas P. Lucht, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 66 days.

This patent is subject to a terminal disclaimer.

(21) Appl. No.: 17/529,257

(22) Filed: Nov. 17, 2021

(65) Prior Publication Data

US 2022/0078676 A1 Mar. 10, 2022

Related U.S. Application Data

(63) Continuation of application No. 16/575,300, filed on Sep. 18, 2019, now Pat. No. 11,218,920.

(Continued)

(51) Int. Cl.
*H04W 36/00* (2009.01)
*H04W 36/14* (2009.01)
(Continued)

(52) U.S. Cl.
CPC ... *H04W 36/0058* (2018.08); *H04W 36/0069* (2018.08); *H04W 36/14* (2013.01); *H04W 36/30* (2013.01); *H04W 76/27* (2018.02)

(58) Field of Classification Search
CPC ............ H04W 36/0058; H04W 76/27; H04W 36/0069; H04W 36/14; H04W 36/30
See application file for complete search history.

(56) References Cited

U.S. PATENT DOCUMENTS

2018/0092085 A1\* 3/2018 Shaheen ............... H04W 36/14
2018/0288657 A1\* 10/2018 Stojanovski ...... H04W 36/0022
2020/0314704 A1 10/2020 Abdel Shahid et al.

FOREIGN PATENT DOCUMENTS

| WO | WO2016108566 A1 | 7/2016 |
| WO | WO2018029932 A1 | 2/2018 |
| WO | WO2018065936 A1 | 4/2018 |

OTHER PUBLICATIONS

3GPP TS 38.331 V15.4.0 (3GPP, TSG RAN; NR; Radio Resource Control (RRC) protocol specification, Dec. 2018 (Release 15)) (Year: 2018).\*

(Continued)

*Primary Examiner* — Chi H Pham
*Assistant Examiner* — Ji-Hae Yea
(74) *Attorney, Agent, or Firm* — Lee & Hayes, P.C.

(57) ABSTRACT

Systems, devices, and techniques described herein relate to handover between Non-Standalone (NSA) and Standalone (SA) networks. An example method includes receiving, from a User Equipment (UE), a measurement report indicating that a signal threshold has been satisfied. In response to receiving the measurement report, handover of a communication session from a first core network to a second core network may be initiated. A message confirming that the communication session has been handed over from the first core network to the second core network can be received. In response to receiving the message, handover of the communication session can be initiated between a single (Continued)

radio bearer associated with a first Radio Access Technology (RAT) and a dual radio bearer associated with the first RAT and a second RAT.

20 Claims, 6 Drawing Sheets

Related U.S. Application Data

(60) Provisional application No. 62/824,186, filed on Mar. 26, 2019.

(51) Int. Cl.
*H04W 36/30* (2009.01)
*H04W 76/27* (2018.01)

(56) References Cited

OTHER PUBLICATIONS

Qualcomm Incorporated ("Inter-system Handover between SA and NSA", 3GPP TSG-RAN3 #101, R3-184683, Aug. 20-24, 2018) (Year: 2018).*
Ericsson ("User plane aspects of conditional handover", 3GPP TSG-RAN WG2#105, R2-1901089, Feb. 25-Mar. 1, 2019) (Year: 2019).*
Ericsson ("Support of NR to EN-DC handover", 3GPP TSG-RAN WG2 #105, R2-1901558, Feb. 25-Mar. 1, 2019) (Year: 2019).*
Vivo ("Serving cell applicability for B event on EN-DC, NG-EN-DC and NE-DC", 3GPP TSG-RAN WG2 Meeting #105, R2-1902674, Feb. 25-Mar. 1, 2019) (Year: 2019).*
3GPP TS 37.340 V15.4.0 (3GPP, TSG RAN; E-UTRA and NR; Multi-connectivity; Stage 2, Dec. 2018 (Release 15)) (Year: 2018).*
3GPP TS 37.340 V15.4.0, Technical Specification Group Radio Access Network; Evolved Universal Terrestrial Radio Access (E-UTRA) and NR; Multi-connectivity; Stage 2, Release 15, Dec. 2018, 69 pages.
3GPP TS 38.3331 v15.4.0, Radio Resource Control(RRC) protocol specification (Release 15), 3GPP Organizational Partners, Dec. 2018, 474 pages.
"5G; NR; Radio Resource Control (RRC); Protocol specification (3GPP TS 38.331 version 15.4.0 Release 15)", ETSI TS 138 331 V15.4.0 (Apr. 2019), Jan. 14, 2019, sections 5.4.2.2, 5.5.1, 5.5.4.9, 473 pages.
Ericsson, "Support of NR to EN-DC handover", R2-1901558, 3GPP TSG RAN WG2 #105, Feb. 14, 2019, Section 2, 11 pages.
Ericsson, User plane aspects of conditional handover, 3 GPP TSG RAN WG2 #105, Feb. 25, 2019-Mar. 1, 2019, 5 pages.
Huawei, et al., "Supporting of using SA IAB in NSA network", R2-1901636, 3GPP TSG-RAN WG2, Feb. 15, 2019, section 2, and figure 1, 4 pages.
Office Action for U.S. Appl. No. 16/575,300, dated Apr. 2, 2021, Abdel Shahid, "Handover Between Non-Standalone and Standalone Networks", 23 pages.
The International Preliminary Report on Patentability for PCT Application No. PCT/US2020/023093, dated Oct. 7, 2021, 8 pages.
The PCT Search Report and Written Opinion for PCT Application No. PCT/US2020/023093, dated Jul. 8, 2020 11 pages.
Qualcomm Incorporated, "(TP for NR BL CR for TS 37.340): Inter-system Handover between SA and NSA", 3GPP TSG-RAN3 #101, Aug. 20-24, 2018, 5 pages.
Vivo, "Serving cell applicability for B event on EN-DC, NG-EN-DC and NE-DC", 3 GPP TSG-RAN WG2 Meeting #105, Feb. 25, 2019-Mar. 1, 2019, 2 pages.
Sharp, "Correction based on intersystem handover from E-UTRA/EPC to NR" R2-1902116, 3GPP TSG-RAN WG2 Meeting #105, Feb. 15, 2019, section 5.3.5.11, 5 pages.
3GPP TR 23.799 v14.0.0, "3rd Generation Partnership Project; Technical Specification Group Services and System Aspects; Study on Architecture for Next Generation System (Release 14)", 3GPP Organizational Partners, Dec. 2016, pp. 1-522.
3GPP TS 36.331 v15.5.0, "3rd Generation Partnership Project;Technical Specification Group Radio Access Network; Evolved Universal Terrestrial Radio Access (E-UTRA); Radio Resource Control (RRC); Protocol Specification (Release 15)", 3GPP Organizational Partners, Mar. 2019, pp. 1-948.
Extended Eurpoean Search Report for European Patent Application No. 20778858.9, dated Sep. 23, 2022, 10 pages.
Qualcomm Incorporated, "3GPP TSG-RAN3 #101, (TP for NR BL CR for TS 37.340): Inter-system Handover between SA and NSA," 3GPP Draft, R3-184683, Aug. 20-24, 2018, 4 pages.

\* cited by examiner

HANDOVER BETWEEN NON-STANDALONE AND STANDALONE NETWORKS

CROSS-REFERENCE TO RELATED APPLICATIONS

The present patent application claims priority to U.S. application Ser. No. 16/575,300, filed on Sep. 18, 2019 and which claims priority to U.S. Provisional Application No. 62/824,186, filed on Mar. 26, 2019, each of which is incorporated by reference herein in its entirety.

BACKGROUND

Cellular communication devices use network radio access technologies to communicate wirelessly with geographically distributed cellular base stations. Long-Term Evolution (LTE) is an example of a widely implemented radio access technology that is used in 4th Generation (4G) communication systems. New Radio (NR) is a newer radio access technology that is used in 5th Generation (5G) communication systems. Standards for LTE and NR radio access technologies have been developed by the 3rd Generation Partnership Project (3GPP) for use by wireless communication carriers.

A communication protocol defined by the 3GPP, referred to as EN-DC (Evolved Universal Terrestrial Radio Access Network (E-UTRAN)/New Radio-Dual Connectivity) enables the simultaneous use of LTE and NR radio access technologies for communications between a mobile device and a cellular communication network. EN-DC may also be referred to as LTE/NR dual connectivity. EN-DC is described by 3GPP Technical Specification (TS) 37.340.

EN-DC can be implemented in conjunction with a 4G core network, with the support of 5G base stations, in a configuration known as Non-Standalone Architecture (NSA). In this configuration, a 4G LTE base station (referred to as a Master eNodeB or MeNB) is associated (e.g., via an X2 interface) with a 5G NR base station (referred to as a Secondary gNodeB or SgNB). In an NSA system, both the LTE base station and the NR base station support a 4G core network. However, control communications are between the 4G core network and the LTE base station, and the LTE base station is configured to communicate with and to control the NR base station.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
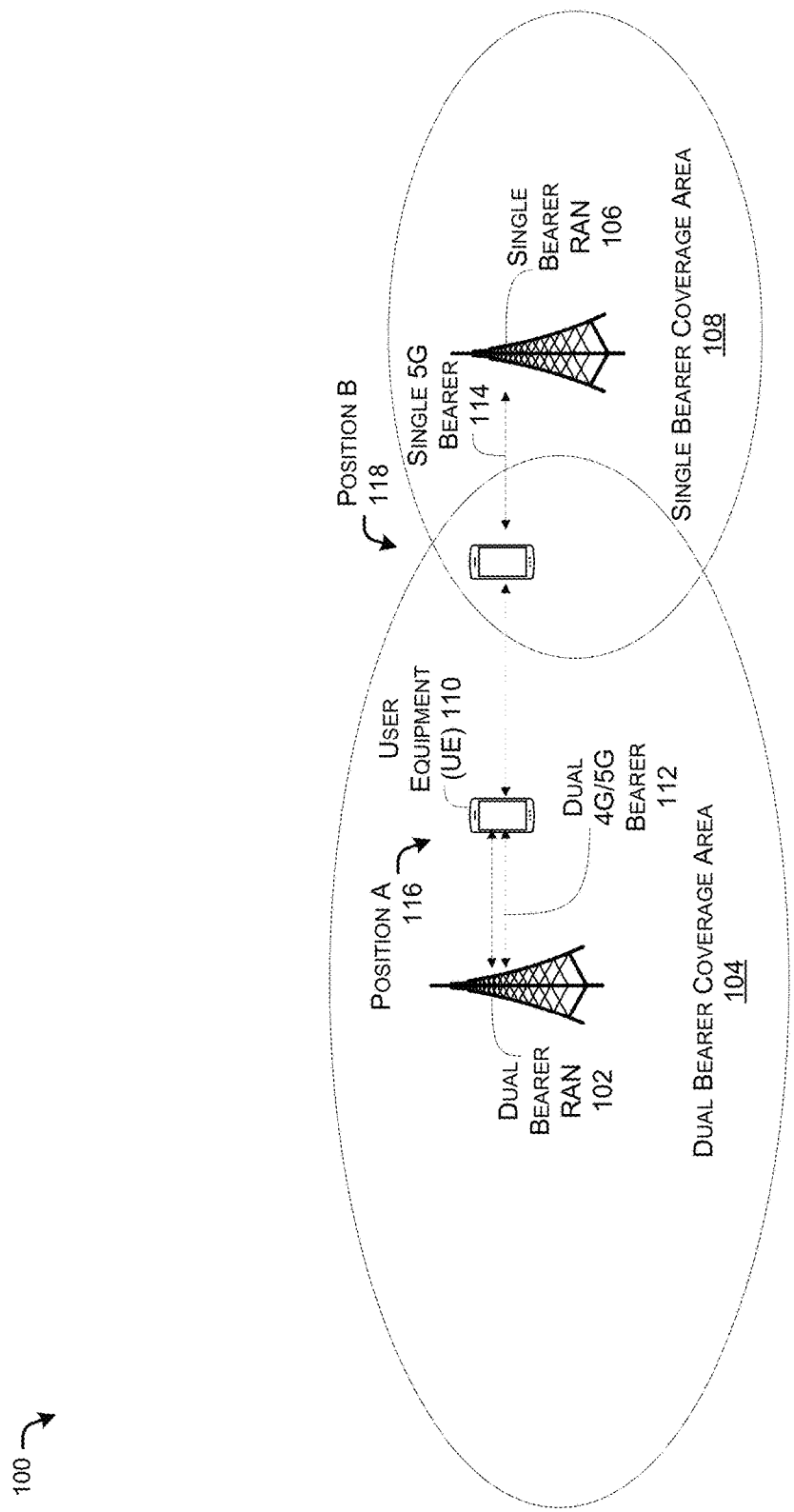
FIG. 1 illustrates an example environment for handover between Non-Standalone (NSA) and Standalone (SA) network environments.

The systems, devices, and techniques described herein relate to handover of communication sessions between Non-Standalone (NSA) and Standalone (SA) networks. In various implementations, handover of a communication session between a User Equipment (UE) and a particular network architecture can be triggered based on radio conditions experienced by the UE.

In some implementations, a communication session provided to a UE over a dual radio bearer provided by a first base station in an NSA network can be handed over to a single radio bearer provided by a second base station in an SA network. For instance, upon receiving a report that a power or quality of a radio signal over the single radio bearer exceeds a particular threshold and/or that a power or quality of a radio signal over the dual radio bearer is below a certain threshold, the first base station may cause a first core network associated with the NSA network to hand over the communication session to a second core network associated with the SA network. In response to receiving a message indicating that the communication session has been handed over to the second core network, the first base station may cause the communication session to be handed over from the dual radio bearer to the single radio bearer provided by the second base station. The first base station may also sever the dual radio bearer between the first base station and the UE.

In various examples, a communication session provided to a UE over a single radio bearer provided by a third base station in an SA network can be handed over to a dual radio bearer provided by a fourth base station in an NSA network. For instance, upon receiving a report that a power or quality of a radio signal received by the UE is below a particular threshold, the third base station may cause a third core network associated with the SA network to hand over the communication session to a fourth core network associated with the NSA network. In response to receiving a message indicating that the communication session has been handed over to the fourth core network, the third base station may cause the communication session to be handed over from the single radio bearer to the dual radio bearer provided by the fourth base station. The third base station may also sever the single radio bearer between the third base station and the UE.

According to various examples, a single radio bearer may be a 5G (e.g., NR) radio bearer. The dual radio bearer may include a 5G radio bearer and a 4G (e.g., LTE) radio bearer. In some cases, the single 5G radio bearer may utilize higher frequency radio spectrum than the 4G radio bearer in the dual radio bearer. Higher frequency radio signals may experience higher attenuation than lower frequency radio signals. Accordingly, a coverage area of the single 5G radio bearer may be smaller than a coverage area of the 4G radio bearer. Due to the inclusion of the 4G radio bearer, the dual radio bearer may be configured to provide services wirelessly to UEs located in a broader area than the single 5G radio bearer.

However, in some cases, the 4G radio bearer may be provided using limited resources. For instance, the 4G radio bearer may be associated with one or more channels in a limited amount of 4G radio resources (e.g., frequency spectrum). Thus, it may be advantageous to avoid the use of the 4G radio bearer in order to conserve the 4G radio resources.

In some cases, a base station managing handover (e.g., the first base station or the third base station) may also forward context data related to the communication session to the next base station (e.g., the second base station or the fourth base station). For example, the base station managing handover may be receiving data in the communication session during the handover process. When the managing base station hands over the communication session to the next base station, the managing base station may also transmit the data received during the handover process to the next base station.

Various implementations of this disclosure relate to managing physical radio bearers based on measurements of radio conditions. Accordingly, example implementations can apply to practical applications in real-world environments.

In addition, various implementations provide specific improvements to the field of telecommunications. For instance, selective handover of a UE between SA and NSA radio bearers may enable a RAN to conserve LTE radio resources while still maintaining a high transfer rate and quality of data received by the UE.

FIG. 1 illustrates an example environment 100 for handover between Non-Standalone (NSA) and Standalone (SA) network environments. As used herein, the terms "Non-Standalone," "Nonstandalone," "NSA," and their equivalents can refer to a telecommunications network architecture that can utilize multiple Radio Access Technologies (RATs) to deliver services to end UEs. In some cases of NSA architectures, 5th Generation (5G) services can be provided to users using existing 4th Generation (4G) architecture.

The NSA network environment may include a dual bearer Radio Access Network (RAN) 102 associated with a dual bearer coverage area 104. As used herein, the term "RAN" and its equivalents may refer to a network including at least one of a 3GPP RAN, such a GSM/EDGE RAN (GERAN), a Universal Terrestrial RAN (UTRAN), or an Evolved UTRAN (E-UTRAN), a 5G UTRAN, or alternatively, via a "non-3GPP" RAN, such as a Wi-Fi RAN, or another type of wireless local area network (WLAN) that is based on the IEEE 802.11 standards. In some instances, a RAN can include a Wi-Fi Access Point (AP). In some cases, a RAN can include an eNodeB, a gNodeB, or a combination thereof. For instance, the dual bearer RAN 102 may include an eNodeB (configured to wirelessly transmit and/or receive signals over one or more Long Term Evolution (LTE) bands) and a gNodeB (configured to wirelessly transmit and/or receive signals over one or more New Radio (NR) bands).

In various examples, the dual bearer RAN 102 may be connected to a 4G core network (e.g., an Evolved Packet Core (EPC)) (not illustrated) and is associated with Option 3, Option 3A, Option 3X, or the like. In examples referred to as "Option 3," user plane data may be transmitted between an end UE and the 4G RAN, between the end UE and the 5G RAN, between the 4G RAN and the 5G RAN, and between the 4G RAN and the 4G core network. In Option 3, control plane data may be transmitted between the end UE and the 4G RAN, between the 4G RAN and the 5G RAN, and between the 4G RAN and the 4G core network. In various implementations of Option 3, both user plane data and control plane data may be transferred through the 4G RAN.

In examples referred to as "Option 3A," user plane data may be transmitted between an end UE and the 4G RAN, between the end UE and the 5G RAN, between the 4G RAN and the 4G core network, and between the 5G RAN and the 4G core network. In Option 3A, control plane data may be transmitted between the end UE and the 4G RAN, between the 4G RAN and the 5G RAN, and between the 4G RAN and the 4G core network. In various instances of Option 3A, user plane data may be transferred through the 4G RAN and/or the 5G RAN, and control plane data may be transferred through the 4G RAN.

In examples referred to as "Option 3X," user plane data can be transmitted between the 5G RAN and the end UE via a 5G radio bearer, between the 5G RAN and the 4G RAN, and between the 5G RAN and the 4G core network. In addition, in Option 3X, control plane data may be transmitted between the 4G RAN and the UE, between the 4G RAN and the 5G RAN, and between the 4G RAN and the 4G core network. Accordingly, in Option 3X, user plane data may be transferred through the 5G RAN and control plane data may be transferred through the 4G RAN. Examples in which the dual bearer RAN 102 is associated with Option 3X will be described in further detail below with respect to FIG. 2.

NSA architectures, such as architectures including the dual bearer RAN 102, can support dual connectivity. As used herein, the terms "dual connection," "dual bearer," or the like can refer to a radio bearer simultaneously utilizing at least two types of RATs. For instance, a dual bearer may include a 4G radio bearer and a 5G radio bearer. According to some examples, user plane data may be transmitted between a 4G core network and an end UE simultaneously via a 4G RAN and a 5G RAN in various NSA deployments.

The SA network environment illustrated in FIG. 1 may include a single bearer RAN 106 associated with a single bearer coverage area 108. As used herein, the terms "Standalone," "SA," and their equivalents can refer to a telecommunications architecture in which a core network can utilize a single RAT to deliver services to end UEs. For instance, in examples of an "Option 1" deployment, user plane data and control plane data between a 4G core network and an end UE may be transferred through a 4G RAN. In examples of an "Option 2" deployment, user plane data and control plane data between a 5G core network (e.g., a 5G Core (5GC)) and an end UE may be transferred through a 5G RAN. In some examples of an "Option 5" deployment, user plane data and control plane data between a 5G core network and an end UE may be transferred through a 4G RAN.

A User Equipment (UE) 110 may move throughout the dual bearer coverage area 104 and/or the single bearer coverage area 108. As used herein, the terms "UE," "user device," "wireless communication device," "wireless device," "communication device," "mobile device," "client device," and "terminal" can be used interchangeably herein to describe any UE (e.g., the first UE 110) that is capable of transmitting/receiving data wirelessly using any suitable wireless communications/data technology, protocol, or standard, such as Global System for Mobile Communications (GSM), Time Division Multiple Access (TDMA), Universal Mobile Telecommunications System (UMTS), Evolution-Data Optimized (EVDO), Long Term Evolution (LTE), Advanced LTE (LTE+), New Radio (NR), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over Internet Protocol (IP) (VoIP), VoLTE, Institute of Electrical and Electronics Engineers' (IEEE) 802.1x protocols, WiMAX, Wi-Fi, Data Over Cable Service Interface Specification (DOCSIS), digital subscriber line (DSL), and/ or any future IP-based network technology or evolution of an existing IP-based network technology.

In general, the UE 110 can be implemented as any suitable type of computing device configured to communicate over a wired or wireless network, including, without limitation, a mobile phone (e.g., a smart phone), a tablet computer, a laptop computer, a Portable Digital Assistant (PDA), a wearable computer (e.g., electronic/smart glasses, a smart watch, fitness trackers, etc.), an Internet-of-Things (IoT) device, an in-vehicle (e.g., in-car) computer, and/or any similar mobile device, as well as situated computing devices including, without limitation, a television (smart television), a Set-Top-Box (STB), a desktop computer, and the like.

When the UE 110 is located in the dual bearer coverage area 104, the UE 110 may be configured to transmit and/or receive data over a dual 4G/5G bearer 112 provided by the dual bearer RAN 102. The dual 4G/5G bearer 112 may include at least two radio bearers: one 4G (e.g., LTE) radio bearer and one 5G (e.g., NR) radio bearer. As used herein, the terms "radio bearer," "radio link," "radio channel," or their equivalents, can refer to one or more radio resources over which data can be transmitted wirelessly between at least two nodes in a network. According to various cases, a radio bearer may be defined according to one or more frequency bands, one or more time intervals, or a combination thereof. In some examples, a radio bearer carrying user plane data may be referred to as a "Data Radio Bearer (DRB)." For instance, services (e.g., voice services) may be transmitted over one or more DRBs. A radio bearer carrying control plane data may be referred to as a "Signaling Radio Bearer (SRB)." For instance, Radio Resource Control (RRC) messages and Non-Access Stratum (NAS) signals may be transmitted over one or more SRBs.

As used herein, the term "5G radio bearer" and its equivalents can refer to a radio bearer utilizing one or more 5G-specific radio resources and/or a 5G-specific signaling protocol. For instance, in various implementations, at least one of NR bands n71, n260, and/or n261 may be specifically allocated to 5G radio signaling. In some cases, 5G-specific radio resources may include millimeter wave radio resources, such as resources within n260 and/or n261.

As used herein, the term "4G radio bearer" and its equivalents can refer to a radio bearer utilizing one or more 4G radio resources and/or a 4G signaling protocol. In some cases, at least one of LTE bands 2, 12, 66, or 71 may be allocated to 4G radio signaling.

When the UE 110 is located in the single bearer coverage area 108, the UE 110 may be configured to transmit and/or receive data over a single 5G bearer 114 provided by the single bearer RAN 106. In various implementations, the single 5G bearer 114 may be a 5G radio bearer.

In various implementations, the UE 110 may move between a Position A 116 and a Position B 116 while being engaged in an ongoing communication session. In some cases, the communication session may be handed over between the NSA network environment (e.g., including the dual bearer RAN 102) and the SA network environment (e.g., including the single bearer RAN 106).

In various instances, the UE 110 may be located at Position A and may be utilizing the NSA network architecture. The UE 110 may be transmitting and/or receiving data wirelessly with the dual bearer RAN 102 over the dual 4G/5G bearer 112. The data may be at least part of the existing communication session.

The dual bearer RAN 102 may transmit at least one message indicating one or more radio thresholds. For instance, the dual bearer RAN 102 may transmit an RRC configuration message that indicates a first threshold that can be compared to a signal received from the single bearer RAN 106. In some cases, the RRC reconfiguration message may further indicate a second threshold that can be compared to a signal received from the dual bearer RAN 102. For example, the RRC reconfiguration message may specify at least one B2 event.

In example instances, the dual bearer RAN 102 may transmit, to the UE 110, a first RRC reconfiguration message indicating the first threshold and a second RRC reconfiguration message indicating the second threshold. In some examples, at least one of the first threshold or the second threshold may include a power threshold, such as a Received Signal Strength Indicator (RSSI), a Reference Signal Received Power (RSRP), or the like. In some cases, at least one of the first threshold or the second threshold may include a signal quality threshold, such as a Reference Signal Received Quality (RSRQ), a Signal to Interference plus Noise Ratio (SINR), or the like.

The RRC reconfiguration message(s) transmitted by the dual bearer RAN 102 to the UE 110 may further identify the signal from the single bearer RAN 106 that can be compared to the first threshold and/or the signal from the dual bearer RAN 102 that can be compared to the second threshold. For instance, the RRC configuration message(s) may identify the type of signal by at least one of a channel, a frequency, a band, a slot, a subframe, or the like, in which the signal to be measured will be transmitted. In various implementations, the signal to be compared to the first threshold is transmitted by the single bearer RAN 106 in a 5G-specific band (e.g., a millimeter wave band, n71, n260 and/or n261). In some cases, the signal to be compared to the second threshold is transmitted by the dual bearer RAN 102 in a 4G-specific band (LTE bands 2, 12, and/or 66) and/or a shared 4G/5G band (e.g., LTE band 71 and NR band n71).

The UE 110 may receive wireless signals from the single bearer RAN 106 and compare the wireless signals to the first threshold. In various examples, the UE 110 may receive wireless signals from the dual bearer RAN 102 and compare the wireless signals to the second threshold. If the UE 110 determines that the signals from the single bearer RAN 106 are above the first threshold and/or that the signals from the dual bearer RAN 102 are below the second threshold, the UE 110 may transmit a report to the dual bearer RAN 102. For instance, the UE 110 may move from Position A 116 to Position B 118, thereby moving to a cell edge of the dual bearer coverage area 104 and entering the single bearer coverage area 108.

Upon receiving the report from the UE 110, the dual bearer RAN 102 may cause the communication session to be handed over from the dual bearer RAN 102 to the single bearer RAN 106. In some cases, the dual bearer RAN 102 may request a first core network associated with the dual bearer RAN 102 (e.g., an EPC) to hand over the communication session to a second core network associated with the single bearer RAN 106 (e.g., a 5GC). The first core network may request the second core network to transfer the communication session. When the second core network has confirmed, to the first core network, that the communication session has been transferred, the first core network may report, to the dual bearer RAN 102, that the communication session has been handed over to the second core network.

In response to identifying that the communication session has been handed over to the second core network, the dual bearer RAN 102 may initiate handover of the communication session to the single bearer RAN 106. In various examples, the dual bearer RAN 102 may transmit, to the UE 110, an instruction to connect to the single bearer RAN 106. The instruction may be, for instance, in an RRC reconfiguration message.

When the UE 110 receives the instruction from the dual bearer RAN 102, the UE 110 may establish a connection with the single bearer RAN 106. For instance, the UE 110 and the single bearer RAN 106 may exchange Session Initiation Protocol (SIP) messages and/or may synchronize. The UE 110 may attach to the single bearer RAN 106. Because the communication session has already been transferred to the second core network associated with the single bearer RAN 106, the UE 110 may be enabled to immediately transmit and/or receive data in the communication session via the single 5G bearer 114 provided by the single bearer RAN 106.

In various cases, the process of transferring the session from the first core network to the second core network may take a non-negligible amount of time. Further, the process of transferring the session from the dual bearer RAN 102 to the single bearer RAN 106 may also take a non-negligible amount of time. During these latency periods, the dual bearer RAN 102 may continue receiving data in the communication session. This data may be referred to as a "session context," "context data," or their equivalent terminology. To ensure that the session context is retained during handover from the NSA network architecture to the SA network architecture, the dual bearer RAN 102 may further cause the session context to be transmitted to the single bearer RAN 106. For instance, the dual bearer RAN 102 may transmit the session context to the first core network, which may transfer the session context to the second core network, which may deliver the second context to the single bearer RAN 106.

In some implementations, the dual bearer RAN 102 may also end the dual 4G/5G bearer 112. For example, the dual bearer RAN 102 may sever the dual 4G/5G bearer 112 in response to transmitting the instruction to the UE 110 to transfer the session to the single bearer RAN 106.

In various implementations, the communication session may be handed over from the single bearer RAN 106 to the dual bearer RAN 102. For instance, the UE 110 may be transmitting and/or receiving data via a the single 5G bearer 114. The data may be part of the communication session.

The single bearer RAN 106 may transmit a message indicating a radio threshold. For instance, the single bearer RAN 106 may transmit an RRC reconfiguration message that indicates a third threshold that can be compared to a signal received from the dual bearer RAN 102. For example, the RRC reconfiguration message may specify an A4 event.

In example instances, the third threshold may include a power threshold, such as an RSSI, an RSRP, or the like. In some cases, the third threshold may include a signal quality threshold, such as an RSRQ, a SINR, or the like. According to some implementations, the third threshold may be the same as the first threshold.

The RRC reconfiguration message transmitted by the single bearer RAN 106 to the UE 110 may further identify the signal from the dual bearer RAN 106 that can be compared to the third threshold. For instance, the RRC reconfiguration message(s) may identify the type of signal by at least one of a channel, a frequency, a band, a slot, a subframe, or the like, in which the signal to be measured will be transmitted. In some cases, the signal to be compared to the third threshold is transmitted by the dual bearer RAN 102 in a 4G-specific band (LTE bands 2, 12, and/or 66) and/or a shared 4G/5G band (e.g., LTE band 71/n71).

The UE 110 may receive wireless signals from the dual bearer RAN 102 and compare the wireless signals to the third threshold. If the UE 110 determines that the signals from the dual bearer RAN 102 are above the third threshold, the UE 110 may transmit a report to the single bearer RAN 106. For instance, the UE 110 may move from Position B 118 to Position A 116, thereby leaving the single bearer coverage area 108 and entering a mid-cell region of the dual bearer coverage area 104.

Upon receiving the report from the UE 110, the single bearer RAN 106 may cause the communication session to be handed over from the single bearer RAN 106 to the dual bearer RAN 102. In some cases, the single bearer RAN 106 may request the second core network associated with the single bearer RAN 106 (e.g., a 5GC) to hand over the communication session to the first core network associated with the dual bearer RAN 102 (e.g., an EPC). The second core network may request the first core network to transfer the communication session. When the first core network has confirmed, to the second core network, that the communication session has been transferred, the second core network may report, to the single bearer RAN 106, that the communication session has been handed over to the first core network.

In response to identifying that the communication session has been handed over to the first core network, the single bearer RAN 106 may initiate handover of the communication session to the dual bearer RAN 102. In various examples, the single bearer RAN 106 may transmit, to the UE 110, an instruction to connect to the dual bearer RAN 102. The instruction may be, for instance, in an RRC reconfiguration message.

When the UE 110 receives the instruction from the single bearer RAN 106, the UE 110 may establish a connection with the dual bearer RAN 102. For instance, the UE 110 and the single bearer RAN 106 may exchange SIP messages and/or may synchronize. The UE 110 may attach to the dual bearer RAN 102. Because the communication session has already been transferred to the first core network associated with the dual bearer RAN 102, the UE 110 may be enabled to immediately transmit and/or receive data in the communication session via the dual 4G/5G bearer 112 provided by the dual bearer RAN 102.

In various cases, the process of transferring the session from the second core network to the first core network may take a non-negligible amount of time. Further, the process of transferring the session from the single bearer RAN 106 to the dual bearer RAN 102 may also take a non-negligible amount of time. During these latency periods, the single bearer RAN 106 may continue receiving session context data. To ensure that the session context is not lost during handover from the SA network to the NSA network, the single bearer RAN 106 may further cause the session context to be transmitted to the dual bearer RAN 102. For instance, the single bearer RAN 106 may transmit the session context to the second core network, which may transfer the session context to the first core network, which may deliver the second context to the dual bearer RAN 102.

In some implementations, the single bearer RAN 106 may also end the single 5G bearer 114 used to communicate with the UE 110. For example, the single bearer RAN 106 may sever the single 5G bearer 114 in response to transmitting the instruction to the UE 110 to transfer the session to the dual bearer RAN 102.

Although not illustrated in FIG. 1, in some cases, the dual bearer RAN 102 and the single bearer RAN 106 may be collocated on the same base station. Accordingly, in some cases, the single bearer coverage area 108 may be substantially contained within the dual bearer coverage area 104.

Figure 2:
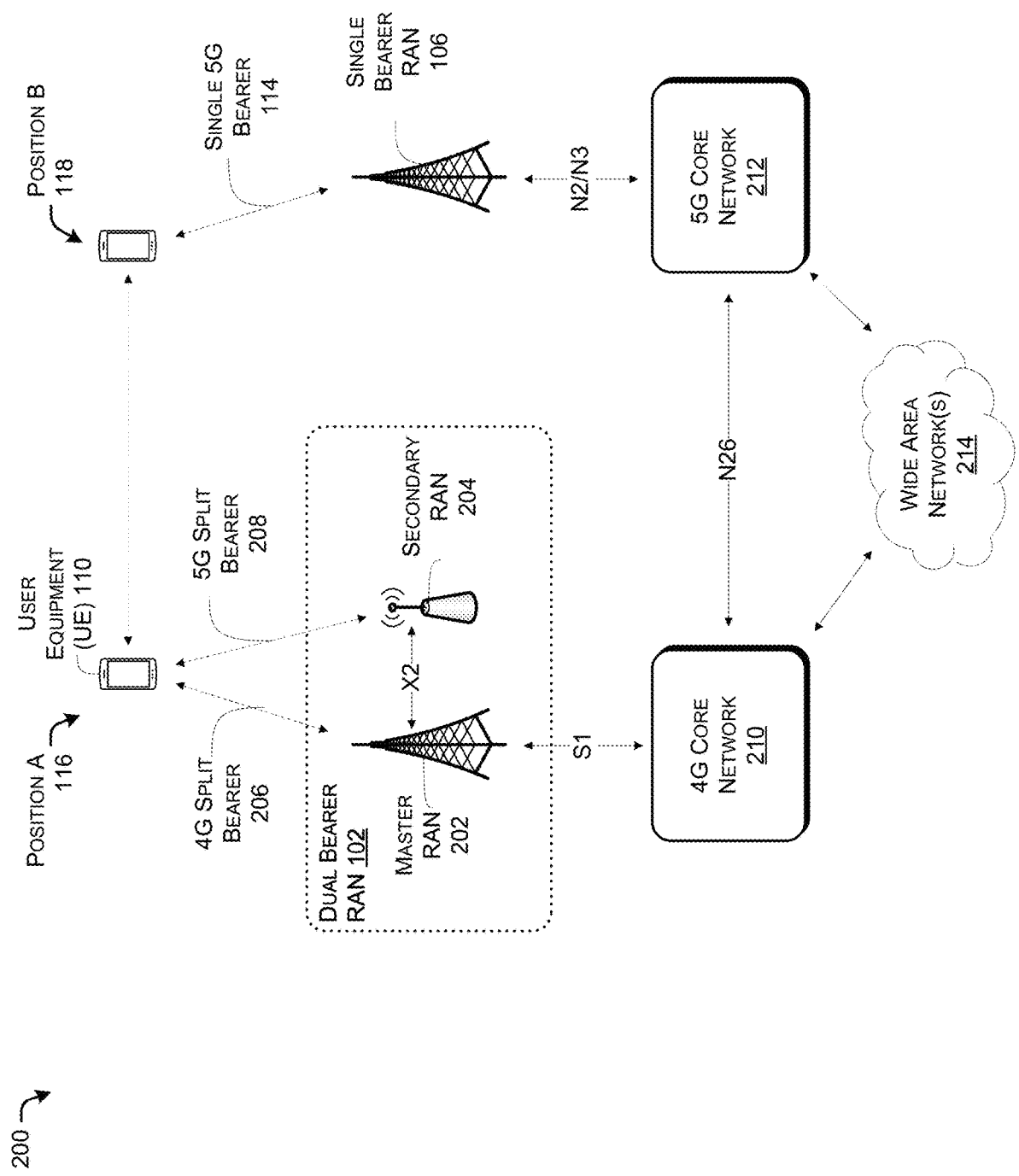
FIG. 2 illustrates an example environment illustrating interfaces and various elements of an NSA network architecture and an SA network architecture.

FIG. 2 illustrates an example environment 200 illustrating interfaces and various elements of a Non-Standalone (NSA) network architecture and a Standalone (SA) network architecture. The example environment 200 illustrated in FIG. 2 includes some constituents of the example environment 100 described above with reference to FIG. 1. For instance, the example environment 200 includes the dual bearer Radio Access Network (RAN) 102, the single bearer RAN 106, the User Equipment (UE) 110, the single 5G bearer 114, Position A 116, and Position B 118, described above with reference to FIG. 1.

In the examples illustrated in FIG. 2, the dual bearer RAN 102 may include a master RAN 202 and a secondary RAN 204. As used herein, the term "master RAN" may refer to a RAN that can communicate wirelessly with at least one UE and can manages and/or controls wireless communications of at least one secondary RAN with the UE(s). As used herein, the term "secondary RAN" may refer to a RAN that can communicate wirelessly with one or more UEs according to control plane data received from a master RAN. For instance, as illustrated in FIG. 2, the master RAN 202 can control the secondary RAN 204.

A 4G split bearer 206 and a 5G split bearer 208, collectively, may be a dual 4G/5G bearer (such as the dual 4G/5G bearer 112 described above with reference to FIG. 1). The master RAN 202 may be configured to transmit and/or receive data with the UE 110 over the 4G split bearer 206. The 4G split bearer 206 may be a Master Cell Group (MCG) bearer. As used herein, the term "MCG bearer" can refer to a radio bearer that is served only by a master RAN. The secondary RAN 204 may be configured to transmit and/or receive data with the UE 110 over the 5G split bearer 208. The 5G split bearer 208 may be a Secondary Cell Group (SCG) bearer. As used herein, the term "SCG bearer" can refer to a radio bearer that is served only by a secondary RAN.

The master RAN 202 and the secondary RAN 204 may be connected to each other over an X2 interface, which may be a backhaul link between the master RAN 202 and the secondary RAN 204. In various implementations, the secondary RAN 204 may forward user plane data between the master RAN 202 and the UE 110 over the X2 interface. As used herein, the term "user plane data" may refer to data included in user traffic transmitted throughout one or more networks. For instance, in a voice call in which voice services are transmitted between two nodes in a network, user plane data may include data comprising the voice services.

In some cases, the master RAN 202 may control the secondary RAN 204 by exchanging control plane data with the secondary RAN 204 over the X2 interface. As used herein, the term "control plane data" may refer to data included in signaling traffic transmitted throughout one or more networks. For instance, control plane data may include RRC messages, control messages, or the like, transmitted between two nodes in a network.

The master RAN 202 may be connected to a 4G core network 210 via at least one S1 interface. In some examples, the 4G core network 210 may include an Evolved Packet Core (EPC). In certain instances, various components of the EPC can include, but are not limited to, a Mobility Management Entity (MME), a Serving Gateway (SGW), a Packet Data Network (PDN) Gateway (PGW), a Home Subscriber Server (HSS), an Access Network Discovery and Selection Function (ANDSF), and/or an evolved Packet Data Gateway (ePDG). An SGW can include a component that handles user-plane data (SGW-U) and a component that handles control-plane data (SGW-C). A PDN can include a component that handles user-plane data (PDN-U) and a component that handles control-plane data (PDN-C). The EPC may further include a Policy and Charging Rules Function (PCRF). Each entity, gateway, server, and function in the 4G core network can be implemented by specialized hardware (e.g., one or more devices), general hardware executing specialized software (e.g., at least one virtual machine executed on one or more devices), or the like.

The S1 interface(s) may include a first S1 interface interconnecting the MME of the 4G core network 210 and the master RAN 202. In some cases, the S1 interface(s) may include a second S1 interface interconnecting the SGW of the 4G core network 210 and the master RAN 202.

As illustrated in FIG. 2, the NSA network including the master RAN 202, the secondary RAN 204, and the 4G core network 210 is consistent with Option 3X. However, implementations of the present disclosure can be adopted for other NSA architectures.

The single bearer RAN 106 may be associated with a 5G core network 212. The 5G core network 212 may be, for example, a 5G Core (5GC). In some examples, various components of the 5GC can include, but are not limited to, a Network Exposure Function (NEF), a Network Resource Function (NRF), an Authentication Server Function (AUSF), an Access and Mobility management Function (AMF), a Policy Control Function (PCF), a Session Management Function (SMF), a Unified Data Management (UDM) function, a User Plane Function (UPF), and/or an Application Function (AF). Each entity, gateway, server, and function in the 5G core network can be implemented by specialized hardware (e.g., one or more devices), general hardware executing specialized software (e.g., at least one virtual machine executed on one or more devices), or the like.

In general, the AMF can be implemented as a network function including functionality to provide UE-based authentication, authorization, mobility management, etc., to various UEs. In some instances, the AMF can include functionality to terminate a RAN control plane interface between the UE 110 and other functions. In some instances, the AMF can include functionality to perform registration management of the UE 110 in the single bearer RAN 106 and/or 5G core network 212, connection management, reachability management, mobility management, access authentication, access authorization, security anchor functionality (e.g., receiving and/or transmitting security keys during registration/authorization), and the like.

In general, the UPF can be implemented as a network function including functionality to control data transfer between the UE 110 and the various other components. In some instances, the UPF can include functionality to act as an anchor point for radio access technology (RAT) handover (e.g., inter and intra), external protocol data unit (PDU) session point of interconnect to an external network (e.g., the Internet), packet routing and forwarding, packet inspection and user plane portion of policy rule enforcement, traffic usage reporting, traffic routing, Quality of Service (QoS) handling for user plane (e.g., packet filtering, gating, uplink/downlink rate enforcement), uplink traffic verification, transport level packet marking in the uplink and downlink, downlink packet buffering and downlink data notification triggering, and the like. As can be understood in the context of this disclosure, there may be one or more UPFs, which are associated with the 5G core network 212 and/or with the UE 110.

The single bearer RAN 106 may be connected to the 5G core network 212 by an N2 interface and/or an N3 interface. In various implementations, the N2 interface may interconnect the AMF in the 5G core network 212 and the single bearer RAN 106. In some cases, the N3 interface may interconnect the UPF in the 5G core network 212 and the single bearer RAN 106.

In various implementations, the 4G core network 210 and the 5G core network 212 may communicate over an N26 interface. In various implementations, the N26 interface can interconnect the MME in the 4G core network 210 and the AMF in the 5G core network 212.

The UE 110 may be configured to communicate with one or more devices in at least one Wide Area Network (WAN) 214. In some cases, the UE 110 may transmit data to, and receive data from, the device(s) of the WAN(s) 214 in one or more communication sessions. In various implementations, the WAN(s) 214 may include one or more Internet Protocol (IP) Multimedia Subsystem (IMS) networks, the Internet, or the like. According to various examples, the device(s) exchanging data with the UE 110 may be one or more other UEs, one or more content servers, or the like.

The UE 110 may exchange data with the device(s) of the WAN(s) 214 via a NSA network or a SA network. The NSA network may include the master RAN 202 and the secondary RAN 204 of the dual bearer RAN 102, as well as the 4G core network 210. The SA network may include the single bearer RAN 106 and the 5G core network 212.

In some examples, the master RAN 202 of the dual bearer RAN 102 may cause a session between the UE 110 and the device(s) of the WAN(s) 214 to be handed over from the NSA network to the SA network. When the session is being provided by the NSA network, user plane data in the session may traverse the 4G core network 210, at least one S1 interface between the master RAN 202 and the 4G core network 210, the master RAN 202, the 4G split bearer 206, the X2 interface between the master RAN 202 and the secondary RAN 204, the secondary RAN 204, and the 5G split bearer 208.

In various implementations, the master RAN 202 may transmit, over the 4G split bearer 206, a message indicating a first threshold that can be used to assess a strength and/or quality of a signal received from the single bearer RAN 106. In some cases, the message may further indicate a second threshold that can be used to asses a strength and/or quality of a signal received from the dual bearer RAN 102. The signal received from the dual bearer RAN 102 may be a signal transmitted by the master RAN 202 over the 4G split bearer 206 and/or a signal transmitted by the secondary RAN 204 over the 5G split bearer 208.

If the UE 110 determines that the strength and/or quality of the signal received from the single bearer RAN 106 exceeds the first threshold and/or that the strength and/or quality of the signal received from the dual bearer RAN 102 is lower than the second threshold, the UE 110 may transmit a report to the master RAN 202. In response to receiving the report, the master RAN 202 may trigger handover from the NSA network to the SA network.

In some cases, the master RAN 202 may initiate handover from the 4G core network 210 to the 5G core network 212. For instance, the master RAN 202 may transmit, over the S1 interface, a request to hand over the session to the 5G core network 212. In response to the request, the 4G core network 210 may transmit, to the 5G core network 212, a session transfer request over the N26 interface. Upon receiving the session, the 5G core network 212 may confirm that the session has been transferred by transmitting a message over the N26 interface. The 4G core network 210 may transmit a message, to the master RAN 202, confirming that the session has been handed over to the 5G core network 212.

In various examples, the master RAN 202 may initiate handover of the session from the dual bearer RAN 102 to the single bearer RAN 106. According to some cases, the master RAN 202 may initiate the handover between the dual bearer RAN 102 and the single bearer RAN 106 in response to confirming that the session has been handed over to the 5G core network 212. In example implementations, the master RAN 202 may transmit, to the UE 110 over the 4G split bearer 206, a request to connect to the single bearer RAN 106. In response, the UE 110 may establish a connection with the single bearer RAN 106 and exchange data with the single bearer RAN 106 over the single 5G bearer 114. The dual bearer RAN 102 may also transmit context data associated with the session to the single bearer RAN 106 (e.g., via a network path including the S1 interface(s), the 4G core network 210, the N26 interface, the 5G core network 212, and the N2 and/or N3 interface), which the single bearer RAN 106 can utilize to continue the session.

In various implementations, because the session has already been handed over to the 5G core network 212, the UE 110 may continue the session with the device(s) of the WAN(s) 214 using the single 5G bearer 114. Accordingly, the session may be supported by the SA network, such that user plane data in the session may traverse the 5G core network 212, the N3 interface between the single bearer RAN 106 and the 5G core network 212, the single bearer RAN 106, and the single 5G bearer 114.

In some examples, the single bearer RAN 106 may cause a session between the UE 110 and the device(s) of the WAN(s) 214 to be handed over from the SA network to the NSA network. When the session is being provided by the SA network, user plane data may traverse the 5G core network 212, the N3 interface between the single bearer RAN 106 and the 5G core network 212, the single bearer RAN 106, and the single 5G bearer 114.

In various implementations, the single bearer RAN 106 may transmit, over the single 5G bearer 114, a message indicating a third threshold that can be used to assess a strength and/or quality of a signal received from the dual bearer RAN 102. The signal received from the dual bearer RAN 102 may be a signal transmitted by the master RAN 202 over the 4G split bearer 206 and/or a signal transmitted by the secondary RAN 204 over the 5G split bearer 208.

If the UE 110 determines that the strength and/or quality of the signal received from the dual bearer RAN 102 exceeds the third threshold, the UE 110 may transmit a report to the single bearer RAN 106. In response to receiving the report, the single bearer RAN 106 may trigger handover from the SA network to the NSA network.

In some cases, the single bearer RAN 106 may initiate handover from the 5G core network 212 to the 4G core network 210. For instance, the single bearer RAN 106 may transmit, over the N2 interface, a request to a component in the 5G core network 212 (e.g., the MME in the 5G core network 212) to hand over the session to the 4G core network 210. In response to the request, the 5G core network 212 (e.g., the MME in the 5G core network 212) may transmit, to the 4G core network 210, a session transfer request over the N26 interface. Upon receiving the session, the 4G core network 210 may confirm that the session has been transferred by transmitting a message to the 5G core network 212 over the N26 interface. The 5G core network 212 may transmit a message, to the single bearer RAN 106, confirming that the session has been handed over to the 4G core network 210.

In various examples, the single bearer RAN 106 may initiate handover of the session from the single bearer RAN 106 to the dual bearer RAN 102. According to some cases, the single bearer RAN 106 may initiate the handover between the single bearer RAN 106 and the dual bearer RAN 102 in response to confirming that the session has been handed over to the 4G core network 210. In example implementations, the single bearer RAN 106 may transmit, to the UE 110 over the single 5G bearer 114, a request to connect to the dual bearer RAN 102. In response, the UE 110 may establish a connection with the dual bearer RAN 102 and exchange data with the master RAN 202 over the 4G split bearer 206 and with the secondary RAN 204 over the 5G split bearer 208. The single bearer RAN 106 may also transmit context data associated with the session to the dual bearer RAN 102 (e.g., via a network path including the N2 and/or N3 interface, the 5G core network 212, the N26 Interface, the 4G core network 210, and the S1 interface(s)), which the dual bearer 102 can utilize to continue the session.

In various implementations, because the session has already been handed over to the 4G core network 210, the UE 110 may continue the session with the device(s) of the WAN(s) 214 using the 4G split bearer 206 and the 5G split bearer 208. Accordingly, the session may be supported by the NSA network, such that user plane data in the session may traverse the 4G core network 210, at least one S1 interface between the master RAN 202 and the 4G core network 210, the master RAN 202, the 4G split bearer 206, the X2 interface between the master RAN 202 and the secondary RAN 204, the secondary RAN 204, and the 5G split bearer 208.

Figure 3:
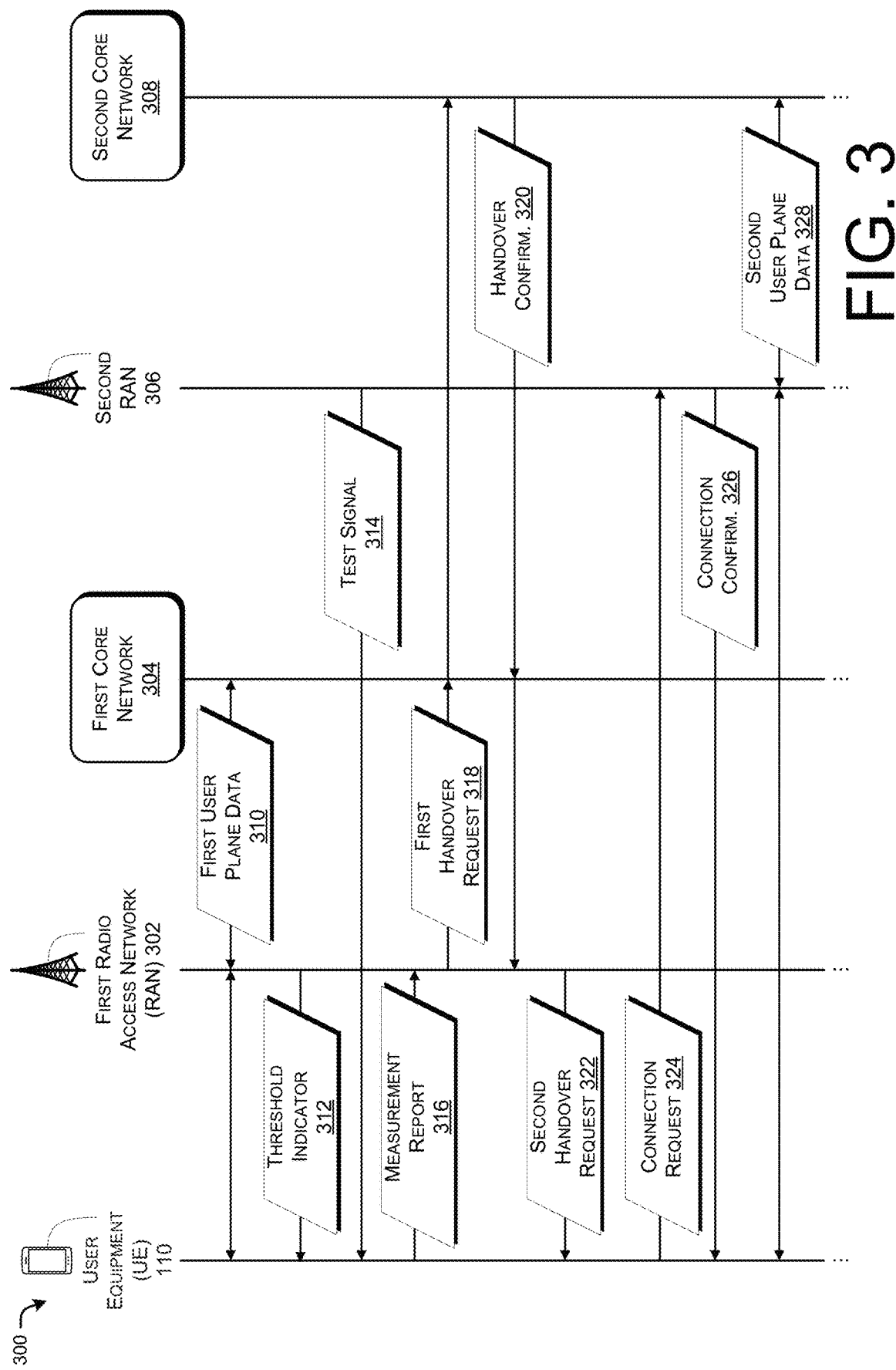
FIG. 3 illustrates example signaling or performing handover of a session between an NSA network and an SA network.

FIG. 3 illustrates example signaling 300 for performing handover of a session between a Non-Standalone (NSA) network and a Standalone (SA) network. The signaling 300 includes data transmitted and/or received by the User Equipment (UE) described above with reference to FIGS. 1 and 2. In addition, the signaling 300 includes data transmitted and/or received by a first Radio Access Network (RAN) 302, a first core network 304, a second RAN 306, and a second core network 308. In various examples, the first RAN 302 may be one of the dual bearer RAN 102 or the single bearer RAN 106 described above with reference to FIGS. 1 and 2, and the second RAN 306 may be the other one of the dual bearer RAN 102 or the single bearer RAN 106. Similarly, in various implementations, the first core network 304 may be one of the 4G core network 210 or the 5G core network 212 described above with reference to FIG. 2, and the second core network 308 may be the other one of the 4G core network 210 or the 5G core network 212. According to example implementations, the first RAN 302 and the first core network 304 may be part of one of the NSA network or the SA network, and the second RAN 306 and the second core network 308 may be part of the other one of the NSA network or the SA network.

As illustrated in FIG. 3, first user plane data 310 is exchanged between the UE 110 and the first core network 304 via the first RAN 302. The first user plane data 310 may be part of a communication session between the UE 110 and another device. Services (e.g., data services) can be delivered to the UE 110 via the first user plane data 310, in various examples.

For instance, in scenarios in which the first core network 304 is an Evolved Packet Core (EPC), the first user plane data 310 may be transmitted over a default bearer (e.g., Quality of Service (QoS) Class Identifier (QCI) 6, QCI 9, or the like). In some examples in which the first core network 304 is a 5GC, the first user plane data 310 may be transmitted over a default 5G QoS Identifier (5QI) (e.g., 5QI6, 5QI9, or the like).

In some cases in which the first RAN 302 is a dual bearer RAN, the first user plane data 310 may be transmitted from an eNodeB to the UE 110 over a Secondary Cell Group (SCG) bearer, to a gNodeB via SCG over an X2 interface, and to the UE 110 via a split bearer provided by the gNodeB.

The first RAN 302 may transmit a threshold indicator 312 to the UE 110. In some cases, the threshold indicator 312 may include at least one signal strength threshold and/or signal quality threshold. Some examples of a signal strength threshold include a power threshold, such as a Received Signal Strength Indicator (RSSI), a Reference Signal Received Power (RSRP), or the like. Some examples of a signal quality threshold may include a Reference Signal Received Quality (RSRQ), a Signal to Interference plus Noise Ratio (SINR), or the like. The threshold indicator 312 may further indicate at least one signal to compare to the threshold(s). For instance, the threshold indicator 312 may indicate a radio signal from the second RAN 306, such as a test signal 314. In some cases, the threshold indicator 312 may further indicate a radio signal from the first RAN 302 to compare to the threshold(s). In various implementations, the threshold indicator 312 may specify one or more thresholds indicative of a B2 event, an A4 event, or the like.

In various instances, the threshold indicator 312 may comprise a Radio Resource Control (RRC) connection reconfiguration message. The RRC message may have a measurement control element specifying that a wireless band utilized by the second RAN 306 has the highest priority of any bands utilized by the first RAN 302 or other local RANs. For instance, if the second RAN 306 utilizes n71, the RRC connection reconfiguration may specify that n71 is the highest priority for wireless communication by the UE 110.

The second RAN 306 may transmit the test signal 314 to the UE 110. The UE 110 may compare the test signal 314 to at least one of the threshold(s). For example, the UE 110 may determine that the test signal 314 has a signal strength that exceeds a signal strength threshold indicated in the threshold indicator 312. In some cases, the UE 110 may determine that the test signal 314 has a signal quality that exceeds a signal quality threshold indicated in the threshold indicator 312.

In some implementations, the UE 110 may further compare a radio signal (not illustrated) received from the first RAN 302 to at least one of the threshold(s). For instance, the UE 110 may determine that the signal from the first RAN 302 has a signal strength that is less than a signal strength threshold indicated in the threshold indicator 312. In various examples, the UE 110 may determine that the signal has a signal quality that is less than a signal quality threshold indicated in the threshold indicator 312.

In response to identifying that the test signal 314 meets a threshold provided by the threshold indicator 312 (and, in some cases, that the signal from the first RAN 302 is below a threshold provided by the threshold indicator 312), the UE 110 may transmit a measurement report 316 to the first RAN 302. The measurement report 316 may indicate that the threshold(s) specified by the threshold indicator 312 has been satisfied.

Upon receiving the measurement report 316, the first RAN 302 may initiate handover of the session from the first core network 304 to the second core network 308. The first RAN 302 may transmit, to the second core network 308, a first handover request 318. The first handover request 318 may be, for instance, a handover preparation message. The first core network 304 may relay the first handover request 318 between the first RAN 302 and the second core network 308. In response to receiving the first handover request 318, the first core network 304 and the second core network 308 may cause the session to be handed over from the first core network 304 to the second core network 308.

In various implementations, the first handover request 318 may identify the session. For instance, the first handover request 318 may identify the UE 110, the first RAN 302, the first core network 304, a type of services exchanged in the first user plane data 310, a device exchanging the first user plane data 310 with the UE 110 via the first RAN 302 and the first core network 304, or the like. Accordingly, the first core network 304 and/or the second core network 308 may arrange session handover.

In various implementations, the first core network 304 may transmit, to the second core network 308, a session transfer message. The session transfer message may establish an equivalent bearer or data flow in the second core network 308 that was served by the first core network 304 to deliver the first user plane data 310. For instance, if the first core network 304 is an EPC and the second core network 308 is a 5GC, the second core network 308 may establish a 5G QoS Indicator (5QI) (e.g., 5QI6) equivalent to the QCI previously used by the first core network 304 (e.g., QCI6) to provide the first user plane data 310 to the UE 110. In some examples, if the first core network 304 is a 5GC and the second core network 308 is an EPC, the second core network 308 may establish a QCI for the session that is equivalent to a 5QI previously used by the first core network 304 to provide the first user plane data 310 to the UE 110.

In response to accepting the session, the second core network 308 may transmit a handover confirmation 320 to the first RAN 302. The first core network 304 may relay the handover confirmation 320 from the second core network 308 to the first RAN 302. The handover confirmation 320 may inform the first RAN 302 that the session has been handed over from the first core network 304 to the second core network 308.

In response to receiving the handover confirmation 320, the first RAN 302 may initiate handover of the session from the first RAN 302 to the second RAN 306. The first RAN 302 may transmit a second handover request 322 to the UE 110. In various implementations, the second handover request 322 may identify the second RAN 306. In some cases, the second handover request 322 may include an RRC connection request.

According to some implementations, the first RAN 302 may also transmit, to the UE 110, an RRC connection reconfiguration message requesting that the existing bearer between the first RAN 302 and the UE 110 (e.g., the SCG bearer) be removed. In some cases, the UE 110 may respond by transmitting, to the first RAN 302, an RRC connection reconfiguration complete message confirming that the existing bearer has been removed.

In accordance with the second handover request 322, the UE 110 may transmit a connection request 324 to the second RAN 306. In some cases, the UE 110 may attach to, exchange Session Initiation Protocol (SIP) messages, and/or synchronize with the second RAN 306. The connection request 324 may identify the existing session. Accordingly, the second RAN 306 may accept the session. Upon accepting the session, the second RAN 306 may transmit a connection confirmation 326 to the UE 110.

Once the session has been handed over to the second core network 308, as well as to the second RAN 306, the UE 110 and the second core network 308 may exchange second user plane data 328. The second user plane data 328 may be relayed between the UE 110 and the second core network 308 by the second RAN 306. The second user plane data 328 may be part of the same session as the first user plane data 310.

Although not illustrated in FIG. 3, the first RAN 302 may receive third user plane data in the session during the signaling 300. The third user plane data may represent context data in the session. For instance, the first RAN 302 may receive at least a portion of the third user plane data from the first core network 304 prior to the session being handed over from the first core network 304 to the second core network 308. In some cases, the first RAN 302 may receive at least a portion of the third user plane data from the UE 110 prior to the session being handed over from the first RAN 302 to the second RAN 306. In various implementations, the first RAN 302 may transmit the third user plane data to the second RAN 306 in response to transmitting the second handover request 322 to the UE 110. Accordingly, the third user plane data may be prevented from being lost as the session is handed over from the first RAN 302 and the first core network 304 to the second RAN 306 and the second core network 308.

Because the first RAN 302 may exchange the first user plane data 310 with a first one of a dual bearer and a single bearer, and the second RAN 306 may exchange the second user plane data 328 with the other one of the dual bearer and the single bearer, the signaling 300 can be used to hand over a session from a NSA network to a SA network and/or to hand over a session from an SA network to a NSA network. In various implementations, resources in the NSA network can be conserved while also ensuring that high-throughput and low-latency 5G services can be consistently delivered to the UE 110.

Figure 4:
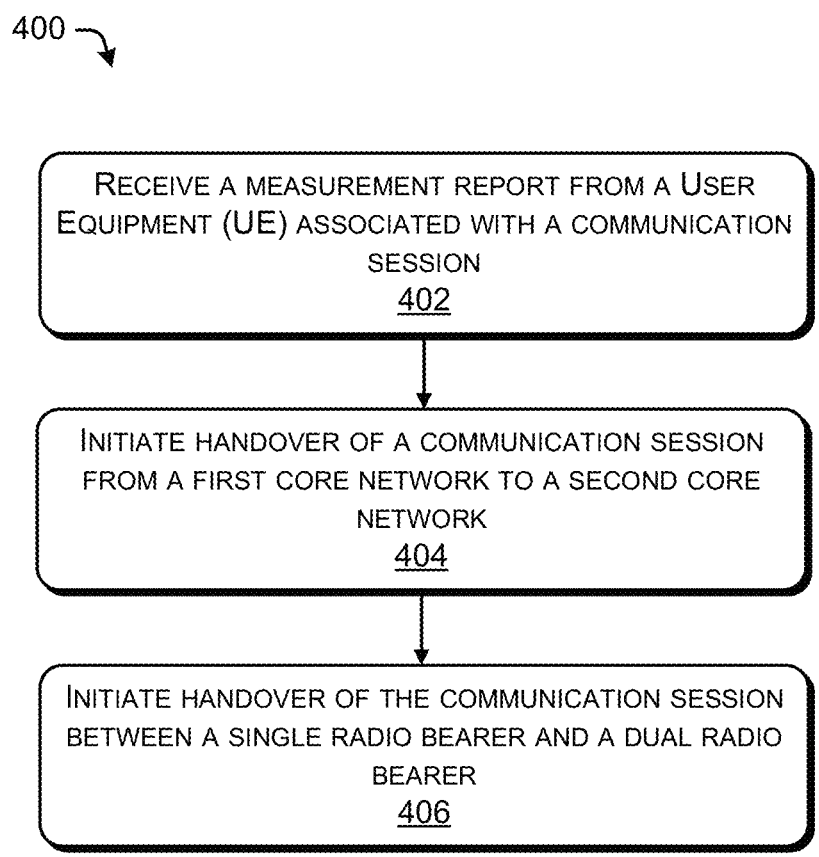
FIG. 4 illustrates a process for handing over a session between a network having an NSA architecture and a network having an SA architecture.
Figure 5:
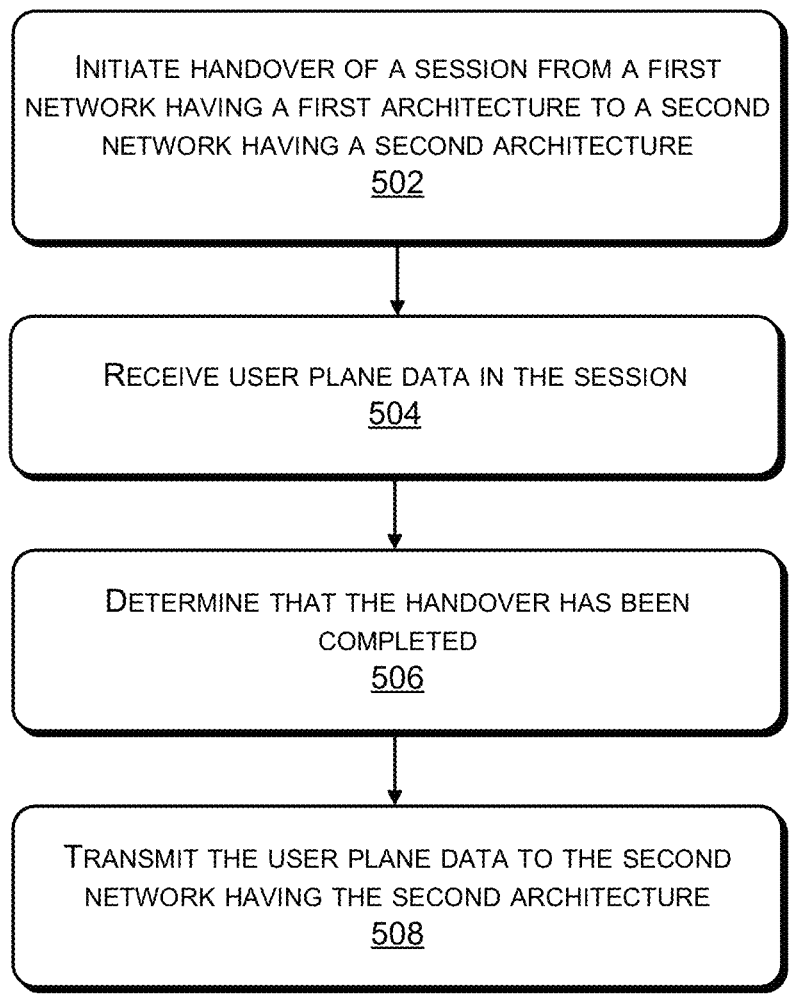
FIG. 5 illustrates a process for transferring session context during handover between a network having an NSA architecture and a network having an SA architecture.

FIGS. 4 and 5 illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 4 illustrates a process 400 for handing over a session between a network having a Non-Standalone (NSA) architecture and a network having a Standalone (SA) architecture. In various implementations, the process 400 can be performed by a base station, a Radio Access Network (RAN) (e.g., the dual bearer RAN 102, the single bearer RAN 106, the master RAN 202, the secondary RAN 204, etc.), an Access Point (AP), or the like. In various cases, the process 400 can be performed by a component in a network (e.g., the network having the NSA architecture or the network having the SA architecture) from which the session is being handed over.

At 402, a measurement report is received from a User Equipment (UE) associated with a communication session.

In various implementations, an indication of one or more thresholds may be transmitted to the UE. For instance, a first threshold to compare to a signal transmitted to the UE by a dual bearer RAN and/or a second threshold to compare to a signal transmitted to the UE by a single bearer RAN may be transmitted to the UE (e.g., by the entity performing the process 400). Each one of the thresholds may be a signal strength threshold, a signal quality threshold, or the like. The UE may receive signals from the dual bearer RAN and/or the single bearer RAN and compare the signals to the first threshold and/or the second threshold. Based on the comparisons, the UE may transmit the measurement report.

In some implementations, the UE may be receiving services (e.g., data services) in the communication session from a NSA network. The NSA network may transmit a first threshold to compare to a signal transmitted by the NSA network and a second threshold to compare to a signal transmitted by an SA network. If the signal transmitted by the NSA network is below the first threshold and the signal transmitted by the SA network is above the second threshold, the UE may generate and transmit the measurement report to the entity performing the process 400.

In example implementations, the UE may be receiving services in the communication session from an SA network. The SA network may transmit a third threshold to compare to a signal transmitted by an NSA network. If the signal transmitted by the NSA network is above the third threshold, the UE may generate and transmit the measurement report to the entity performing the process 400.

At 404, handover of the communication session from a first core network to a second core network is initiated. In various implementations, 404 may include transmitting, to the first core network, a request to hand over the communication session to the second core network. The first core network may forward the request to the second core network. The first core network and/or the second core network may handover the communication session from the first core network to the second core network.

In some implementations, the UE may be receiving services in the communication session from the NSA network. The first core network may be a 4G core network. The second core network may be a 5G core network.

In some cases, the UE may be receiving services in the communication session from the SA network. The first core network may be a 5G core network. The second core network may be a 4G core network.

At 406, handover of the communication session between a single radio bearer and a dual radio bearer is initiated. In various examples, a handover confirmation message may be received from the first core network and/or the second core network. The handover confirmation message may indicate that core handover has been performed.

In response to receiving the handover confirmation message, the entity performing 400 may perform 406. In various examples, a handover request may be transmitted to the UE. The UE may be connected to a first RAN associated with the first core network. The handover request may cause the UE to connect to a second RAN associated with the second core network. In various implementations, the first RAN may be one of a dual bearer RAN and a single bearer RAN, and the second RAN may be the other one of the dual bearer RAN and the single bearer RAN. Accordingly, in various examples, the process 400 may be utilized to hand over a session between an NSA network and an SA network.

FIG. 5 illustrates a process 500 for transferring session context during handover between a network having a Non-Standalone (NSA) architecture and a network having a Standalone (SA) architecture. In various implementations, the process 500 can be performed by a base station, a Radio Access Network (RAN) (e.g., the dual bearer RAN 102, the single bearer RAN 106, the master RAN 202, the secondary RAN 204, etc.), an Access Point (AP), or the like. In various cases, the process 400 can be performed by a component in a network (e.g., the network having the NSA architecture or the network having the SA architecture) from which the session is being handed over.

At 502, handover of a session from a first network to a second network is initiated. The session may include the exchange of user plane data between a User Equipment (UE) and another device via the first network. The first network may have a first architecture and the second network may have a second architecture. For instance, the first network may have an NSA network architecture and the second network may have an SA network architecture. In some cases, the first network may have an SA network architecture and the second network may have an NSA network architecture.

In various implementations, the first network (e.g., a first RAN in the first network) may initiate handover of the session from a first core network in the first network to a second core network in the second network. In example implementations, the first core network may be a 4G core network and the second core network may be a 5G core network, or the first core network may be a 5G core network and the second core network may be a 4G core network. In some cases, after the session has been handed over from the first core network to the second core network, the first RAN in the first network may initiate handover of the session from the first RAN to a second RAN in the second network. The handover from the first RAN to the second RAN may be initiated by transmitting a handover request to the UE. In various examples, the first RAN may be a dual bearer RAN and the second RAN may be a single bearer RAN, or the first RAN may be a single bearer RAN and the second RAN may be a dual bearer RAN.

At 504, user plane data in the session is received. According to some cases, the user plane data may be received by the first RAN from the first network between a first time point at which the handover from the first core network to the second core network is initiated and a second time point at which the handover from the first core network to the second core network is completed. In various examples, the user plane data may be received by the first RAN from the UE between the second time point and a third time point at which the handover of the session from the first RAN to the second RAN has been initiated.

At 506, the handover is determined to be completed. In some cases, the handover may be determined to be completed in response to the first RAN transmitting the handover request to the UE. In various examples, the handover may be determined to be completed in response to waiting a predetermined period of time (e.g., 10-30 milliseconds) after the handover request has been transmitted to the UE. In some implementations, a confirmation that the handover has been completed may be received from the second RAN, the UE, or a combination thereof. Upon completion of the handover, the session may be handed over to the second core network as well as the second RAN.

At 508, the user plane data is transmitted to the second network. In various implementations, the user plane data may be transmitted to the second RAN in the second network. The second RAN may forward the user plane data to its destination (e.g., to the UE or to the device communicating with the UE). Accordingly, the user plane data that is received by the first RAN during handover latency may be retained during the handover process.

Figure 6:
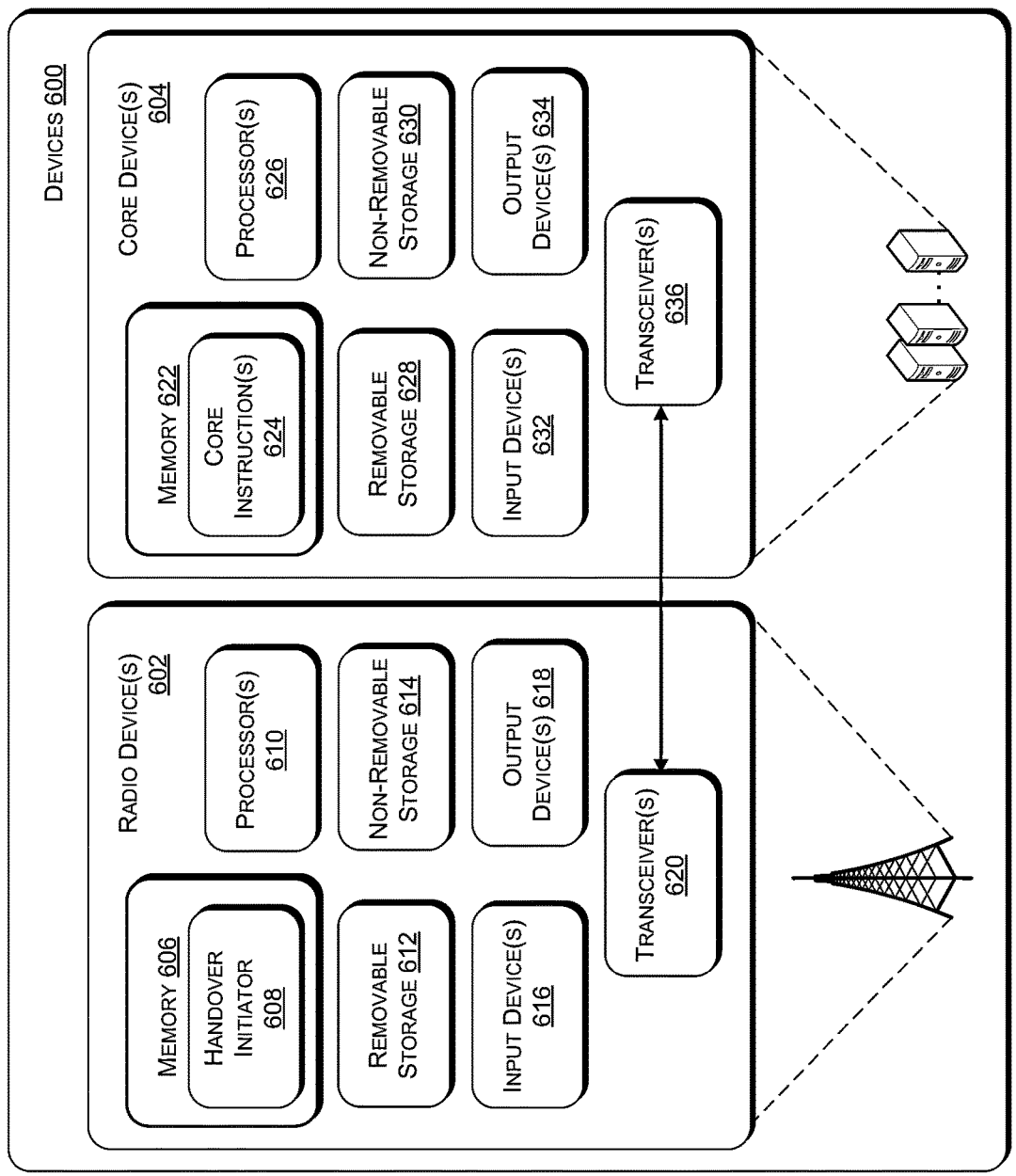
FIG. 6 illustrates example devices configured to initiate handover between an NSA network and an SA network

FIG. 6 illustrates example devices 600 configured to initiate handover between a Non-Standalone (NSA) network and a Standalone (SA) network. In some embodiments, some or all of the functionality discussed in connection with FIGS. 1-5 can be implemented in the device(s) 600. Further, the device(s) 600 can be implemented as one or more server computers, at least one network element on a dedicated hardware, as at least one software instance running on a dedicated hardware, or as at least one virtualized function instantiated on an appropriate platform, such as a cloud infrastructure, and the like. It is to be understood in the context of this disclosure that the device(s) 600 can be implemented as a single device or as a plurality of devices with components and data distributed among them.

As illustrated, the device(s) 600 can include one or more radio devices 602 and one or more core devices 604. The radio device(s) 602 may comprise, for instance, an eNodeB, a gNodeB, or any other device configured to transmit and/or receive data wirelessly from an external device (e.g., a User Equipment (UE)). The radio device(s) 602 can comprise a memory 606. In various embodiments, the memory 606 is volatile (including a component such as Random Access Memory (RAM)), non-volatile (including a component such as Read Only Memory (ROM), flash memory, etc.) or some combination of the two.

The memory 606 may include various components, such as a handover initiator 608. The handover initiator 608 can comprise methods, threads, processes, applications, or any other sort of executable instructions. The handover initiator 608, and various other elements stored in the memory 606, can also include files and databases.

The memory 606 may include various instructions (e.g., instructions in the handover initiator 608), which can be executed by at least one processor 610 to perform operations. In some embodiments, the processor(s) 610 includes a Central Processing Unit (CPU), a Graphics Processing Unit (GPU), or both CPU and GPU, or other processing unit or component known in the art.

The radio device(s) 602 can also include additional data storage devices (removable and/or non-removable) such as, for example, magnetic disks, optical disks, or tape. Such additional storage can include removable storage 612 and non-removable storage 614. Tangible computer-readable media can include volatile and nonvolatile, removable and non-removable media implemented in any method or technology for storage of information, such as computer readable instructions, data structures, program modules, or other data. The memory 606, removable storage 612, and non-removable storage 614 are all examples of computer-readable storage media. Computer-readable storage media include, but are not limited to, RAM, ROM, EEPROM, flash memory or other memory technology, CD-ROM, Digital Versatile Discs (DVDs), Content-Addressable Memory (CAM), or other optical storage, magnetic cassettes, magnetic tape, magnetic disk storage or other magnetic storage devices, or any other medium which can be used to store the desired information and which can be accessed by the radio device(s) 602. Any such tangible computer-readable media can be part of the radio device(s) 602.

The radio device(s) 602 also can include input device(s) 616, such as a keypad, a cursor control, a touch-sensitive display, voice input device, etc., and output device(s) 618 such as a display, speakers, printers, etc. These devices are well known in the art and need not be discussed at length here. In particular implementations, a user can provide input to the radio device(s) 602 via a user interface associated with the input device(s) 616 and/or the output device(s) 618.

The radio device(s) 602 can also include one or more wired or wireless transceiver(s) 620. For example, the transceiver(s) 620 can include a Network Interface Card (NIC), a network adapter, a Local Area Network (LAN) adapter, or a physical, virtual, or logical address to connect to the various base stations or networks contemplated herein, for example, or the various user devices and servers. To increase throughput when exchanging wireless data, the transceiver(s) 620 can utilize Multiple-Input/Multiple-Output (MIMO) technology. The transceiver(s) 620 can include any sort of wireless transceivers capable of engaging in wireless, Radio Frequency (RF) communication. The transceiver(s) 620 can also include other wireless modems, such as a modem for engaging in Wi-Fi, WiMAX, Bluetooth, or infrared communication.

In some implementations, the transceiver(s) 620 can be used to communicate between various functions, components, modules, or the like, that are comprised in the devices 600. For instance, the transceiver(s) 620 can be used to transmit data between the radio device(s) 602 and an external User Equipment (UE), between the radio device(s) 602 and the core device(s) 604, or the like.

In various implementations, the radio device(s) 602 may support dual and/or single connectivity. For instance, the transceiver(s) 620 may support communication with the UE via a dual bearer or a single bearer. In some cases, the transceiver(s) 620 are configured to transmit and/or receive data wirelessly over one or more 5G-specific radio resources, one or more 4G-specific radio resources, or a combination thereof.

In various examples, the core device(s) 604 can include at least one of a 2G core network, a 3G core network, a 4G core network (e.g., an Evolved Packet Core (EPC)), or a 5G core network. For instance, the core device(s) 604 may include an EPC or 5G core network.

The core device(s) 604 can comprise a memory 622. In various embodiments, the memory 622 is volatile (including a component such as RAM), non-volatile (including a component such as ROM, flash memory, etc.) or some combination of the two.

The memory 622 may include various components, such as core instruction(s) 624. The core instruction(s) 624 can comprise methods, threads, processes, applications, or any other sort of executable instructions. The core instruction(s) 624, and various other elements stored in the memory 622 can also include files and databases.

The memory 622 may include various instructions (e.g., instructions in the core instruction(s) 624), which can be executed by at least one processor 626 to perform operations. In some embodiments, the processor(s) 626 includes a CPU, a GPU, or both CPU and GPU, or other processing unit or component known in the art.

The core device(s) 604 can also include additional data storage devices (removable and/or non-removable) such as, for example, magnetic disks, optical disks, or tape. Such additional storage can include removable storage 628 and non-removable storage 630. Tangible computer-readable media can include volatile and nonvolatile, removable and non-removable media implemented in any method or technology for storage of information, such as computer readable instructions, data structures, program modules, or other data. The memory 622, removable storage 628, and non-removable storage 630 are all examples of computer-readable storage media. Computer-readable storage media include, but are not limited to, RAM, ROM, EEPROM, flash memory or other memory technology, CD-ROM, DVDs, CAM, or other optical storage, magnetic cassettes, magnetic tape, magnetic disk storage or other magnetic storage devices, or any other medium which can be used to store the desired information and which can be accessed by the core device(s) 604. Any such tangible computer-readable media can be part of the core device(s) 604.

The core device(s) 604 also can include input device(s) 632, such as a keypad, a cursor control, a touch-sensitive display, voice input device, etc., and output device(s) 634 such as a display, speakers, printers, etc. These devices are well known in the art and need not be discussed at length here. In particular implementations, a user can provide input to the core device(s) 604 via a user interface associated with the input device(s) 632 and/or the output device(s) 634.

The core device(s) 604 can also include one or more wired or wireless transceiver(s) 636. For example, the transceiver(s) 636 can include a NIC, a network adapter, a LAN adapter, or a physical, virtual, or logical address to connect to the various base stations or networks contemplated herein, for example, or the various user devices and servers. To increase throughput when exchanging wireless data, the transceiver(s) 636 can utilize MIMO technology. The transceiver(s) 636 can include one or more wireless transceivers capable of engaging in wireless, RF communication. The transceiver(s) 636 can also include other wireless modems, such as a modem for engaging in Wi-Fi, WiMAX, Bluetooth, or infrared communication.

In some implementations, the transceiver(s) 636 can be used to communicate between various functions, components, modules, or the like, that are comprised in the device(s) 600. For instance, the transceiver(s) 636 can be used to transmit data between the core device(s) 604 and the radio device(s) 602, between the core device(s) 604 and another network (e.g., an IP Multimedia Subsystem (IMS) network, data network, the Internet, another core network, etc.), or the like.

EXAMPLE CLAUSES

The following clauses provide various implementations of the present disclosure:

A. A method performed by dual-bearer Radio Access Network (RAN), the method including: receiving, from an Evolved Packet Core (EPC), user plane data associated with a communication session; transmitting, to a User Equipment (UE) via a Non-Standalone (NSA) dual radio bearer, the user plane data; transmitting, to the UE, first control plane data indicating a first B2 radio signal threshold and a second B2 radio signal threshold; receiving, from the UE, second control plane data indicating that a first radio signal received by the UE over the dual radio bearer is below the first B2 radio signal threshold and a second radio signal received by the UE over a single radio bearer is above the second B2 radio signal threshold; in response to receiving the second control plane data, transmitting, to the EPC, third control plane data instructing the EPC to hand over the communication session to a 5th Generation (5G) Core (5GC); receiving, from the EPC, fourth control plane data indicating the communication session has been handed over to the 5GC; and transmitting, to the UE, a Radio Resource Control (RRC) message instructing the UE to hand over the communication session to a single bearer RAN supporting the single radio bearer.

B. The method of clause A, wherein the user plane data is first user plane data, the method further including: receiving, from the EPC, second user plane data associated with the communication session; and transmitting, to the single bearer RAN, the second user plane data.

C. The method of clause A or B, wherein the dual radio bearer includes a 4th Generation (4G) radio bearer and a first 5G radio bearer, and wherein the single radio bearer includes a second 5G radio bearer.

D. A system including: at least one processor; and memory storing instructions that, when executed by the at least one processor, cause the at least one processor to perform operations including: receiving, from a User Equipment (UE), a measurement report indicating that a signal threshold has been satisfied; in response to receiving the measurement report, initiating handover of a communication session associated with the UE from a first core network to a second core network; receiving a message confirming that the communication session has been handed over from the first core network to the second core network; and in response to receiving the message, initiating handover of the communication session between a single radio bearer associated with a first Radio Access Technology (RAT) and a dual radio bearer associated with the first RAT and a second RAT.

E. The system of clause D, wherein initiating handover of the communication session between the single radio bearer and the dual radio bearer includes initiating handover from the single radio bearer to the dual radio bearer.

F. The system of clause E, wherein the operations further include: transmitting, to the UE over the single radio bearer, a message indicating the signal threshold, wherein the measurement report indicates that a signal strength or signal quality of radio signal received by the UE over the dual radio bearer is greater than the signal threshold.

G. The system of clause E or F, wherein the first core network includes a 5th Generation (5G) Core (5GC) and the second core network includes an Evolved Packet Core (EPC).

H. The system of any one of clauses E to G, wherein initiating handover of the communication session between the single radio bearer and the dual radio bearer includes initiating handover from the dual radio bearer to the single radio bearer.

I. The system of clause H, wherein the signal threshold is a first signal threshold, and the operations further include: transmitting, to the UE over the dual radio bearer, a message indicating the first signal threshold and a second signal threshold, wherein the measurement report indicates that a first signal strength or first signal quality of a first radio signal received by the UE over the single radio bearer exceeds the first signal threshold and that a second signal strength or second signal quality of second radio signal received by the UE over the dual radio bearer is less than the second signal threshold.

J. The system of clause H, wherein the first core network includes an Evolved Packet Core (EPC) and the second core network includes a 5th Generation (5G) Core (5GC).

K. The system of any one of clauses D to J, wherein the first RAT includes a 5th Generation (5G) RAT and the second RAT includes a 4th Generation (4G) RAT.

L. The system of any one of clauses D to K, wherein the operations further include: in response to initiating handover of the communication session from the first core network to the second core network, receiving user plane data associated with the communication session from the first core network; determining that the handover of the communication session between the single radio bearer the dual radio bearer is completed; and in response to determining that the handover of the communication session between the single radio bearer and the dual radio bearer is completed, transmitting the user plane data to a Radio Access Network (RAN) associated with the second core network.

M. A method including: receiving, from a User Equipment (UE), a measurement report indicating that a signal threshold has been satisfied; in response to receiving the measurement report, initiating handover of a communication session associated with the UE from a first core network to a second core network; receiving a message confirming that the communication session has been handed over from the first core network to the second core network; and in response to receiving the message, initiating handover of the communication session between a single radio bearer associated with a first Radio Access Technology (RAT) and a dual radio bearer associated with the first RAT and a second RAT.

N. The method of clause M, wherein initiating handover of the communication session between the single radio bearer and the dual radio bearer includes initiating handover from the single radio bearer to the dual radio bearer.

O. The method of clause N, further including: transmitting, to the UE over the single radio bearer, a message indicating the signal threshold, wherein the measurement report indicates that a signal strength or signal quality of radio signal received by the UE over the dual radio bearer is greater than the signal threshold.

P. The method of clause N or O, wherein the first core network includes a 5th Generation (5G) Core (5GC) and the second core network includes an Evolved Packet Core (EPC).

Q. The method of any one of clauses M to P, wherein initiating handover of the communication session between the single radio bearer and the dual radio bearer includes initiating handover from the dual radio bearer to the single radio bearer.

R. The method of clause Q, wherein the signal threshold is a first signal threshold, and the method further includes: transmitting, to the UE over the dual radio bearer, a message indicating the first signal threshold and a second signal threshold, wherein the measurement report indicates that a first signal strength or first signal quality of a first radio signal received by the UE over the single radio bearer exceeds the first signal threshold and that a second signal strength or second signal quality of second radio signal received by the UE over the dual radio bearer is less than the second signal threshold.

S. The method of clause R, wherein the first core network includes an Evolved Packet Core (EPC) and the second core network includes a 5th Generation (5G) Core (5GC).

T. The method of any one of clauses M to S, further includes: in response to initiating handover of the communication session from the first core network to the second core network, receiving user plane data in the communication session from the first core network; determining that the handover of the communication session between the single radio bearer the dual radio bearer is completed; and in response to determining that the handover of the communication session between the single radio bearer and the dual radio bearer is completed, transmitting the user plane data to a Radio Access Network (RAN) associated with the second core network.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
   at least one processor; and
   memory storing instructions that, when executed by the at least one processor, cause the at least one processor to perform operations comprising:
   receiving, from a User Equipment (UE), a measurement report indicating that a signal threshold has been satisfied;
   based at least in part on receiving the measurement report, initiating handover of a communication session associated with the UE from a first component associated with a first Radio Access Technology (RAT) to a second component associated with a second RAT;
   based at least in part on initiating handover of the communication session from the first component to the second component, receiving user plane data associated with the communication session from the first component;
   receiving a message confirming that the communication session has been handed over from the first component to the second component;
   based at least in part on receiving the message, initiating handover of the communication session between a single radio bearer associated with the first RAT and a dual radio bearer associated with the first RAT and the second RAT;
   determining that the handover of the communication session between the single radio bearer and the dual radio bearer is completed; and
   based at least in part on determining that the handover of the communication session between the single radio bearer and the dual radio bearer is completed, transmitting the user plane data to the second component.

2. The system of claim 1, wherein the system comprises a Radio Access Network (RAN).

3. The system of claim 1, wherein the first RAT comprises a 5th Generation (5G) RAT and the second RAT comprises a 4th Generation (4G) RAT.

4. A system comprising:
   at least one processor; and
   memory storing instructions that, when executed by the at least one processor, cause the at least one processor to perform operations comprising:

initiating handover of a communication session associated with a User Equipment (UE) from a first component to a second component;

based at least in part on initiating handover of the communication session from the first component to the second component, receiving user plane data associated with the communication session from the first component;

determining that the communication session has been handed over from the first component to the second component;

based at least in part on determining that the communication session has been handed over from the first component to the second component, initiating handover of the communication session between a single radio bearer associated with a first Radio Access Technology (RAT) and a dual radio bearer associated with the first RAT and a second RAT;

determining that the handover of the communication session between the single radio bearer and the dual radio bearer is completed; and based at least in part on determining that the handover of the communication session between the single radio bearer and the dual radio bearer is completed, transmitting the user plane data to the second component.

5. The system of claim 4, wherein a first core network comprises the first component and a second core network comprises the second component.

6. The system of claim 5, wherein the first core network comprises a $5^{th}$ Generation (5G) core (5GC) and the second core network comprises an Evolved Packet Core (EPC).

7. The system of claim 4, wherein the operations further comprise determining that a measurement report from the UE indicates that a signal threshold has been satisfied.

8. The system of claim 7, wherein the measurement report indicates that a signal strength or signal quality of radio signal received by the UE over the single radio bearer or the dual radio bearer is greater than the signal threshold.

9. The system of claim 4, wherein receiving the user plane data associated with the communication session from the first component comprises receiving the user plane data over an S1 interface.

10. The system of claim 4, wherein the first RAT comprises a $5^{th}$ Generation (5G) RAT and the second RAT comprises a $4^{th}$ Generation (4G) RAT.

11. The system of claim 4, wherein transmitting the user plane data to the second component comprises transmitting the user plane data to the second component via an S1 interface and an N26 interface connecting the first component to the second component.

12. The system of claim 4, the user plane data being first user plane data, the system further comprising:

a first transceiver configured to at least one of receive or transmit a first portion of second user plane data over the first RAT in the dual radio bearer; and a second transceiver configured to at least one of receive or transmit a second portion of the second user plane data over the second RAT in the dual radio bearer.

13. The system of claim 4, the user plane data being first user plane data, the system further comprising:

a transceiver configured to at least one of receive or transmit second user plane data over the first RAT in the single radio bearer.

14. A method, comprising:

initiating handover of a communication session associated with a User Equipment (UE) from a first component to a second component;

based at least in part on initiating handover of the communication session from the first component to the second component, receiving user plane data associated with the communication session from the first component;

determining that the communication session has been handed over from the first component to the second component;

based at least in part on determining that the communication session has been handed over from the first component to the second component, initiating handover of the communication session between a single radio bearer associated with a first Radio Access Technology (RAT) and a dual radio bearer associated with the first RAT and a second RAT;

determining that the handover of the communication session between the single radio bearer and the dual radio bearer is completed; and based at least in part on determining that the handover of the communication session between the single radio bearer and the dual radio bearer is completed, transmitting the user plane data to the second component.

15. The method of claim 14, wherein a $5^{th}$ Generation (5G) core (5GC) comprises the first component and an Evolved Packet Core (EPC) comprises the second component.

16. The method of claim 14, further comprising:

receiving, from the UE, a measurement report indicating that a signal strength or signal quality of a radio signal received by the UE over the single radio bearer or the dual radio bearer is greater than a signal threshold.

17. The method of claim 14, wherein receiving the user plane data associated with the communication session from the first component comprises receiving the user plane data over an S1 interface, and wherein transmitting the user plane data to the second component comprises transmitting the user plane data to the second component via an S1 interface and an N26 interface connecting the first component to the second component.

18. The method of claim 14, wherein the first RAT comprises a $5^{th}$ Generation (5G) RAT and the second RAT comprises a $4^{th}$ Generation (4G) RAT.

19. The method of claim 14, the user plane data being first user plane data, the method further comprising:

transmitting or receiving, by a first transceiver over the first RAT in the dual radio bearer, a first portion of second user plane data; and transmitting or receiving, by a second receiver over the second RAT in the dual radio bearer, a second portion of the second user plane data.

20. The method of claim 14, the user plane data being first user plane data, the method further comprising:

transmitting or receiving, by a transceiver over the first RAT in the single radio bearer, second user plane data.

* * * * *